United States Patent Office 2,951,663
Patented Sept. 6, 1960

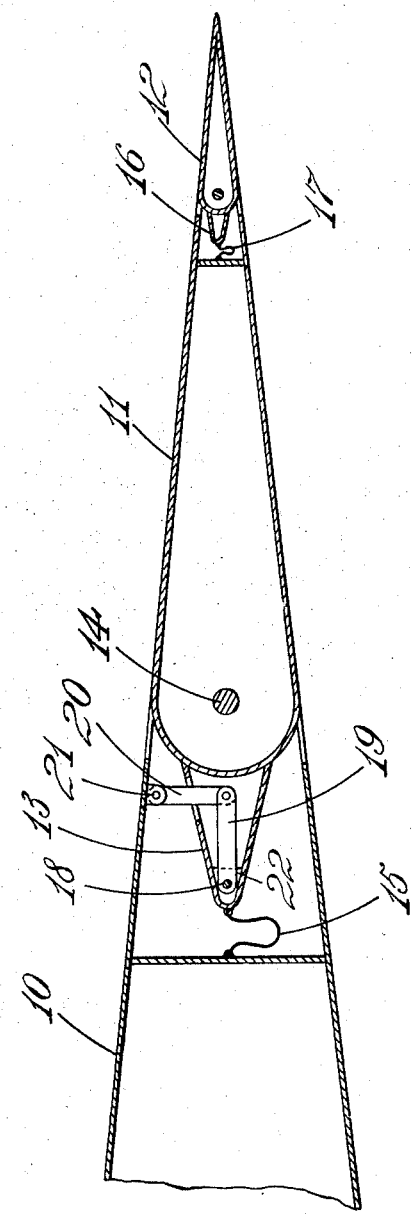

2,951,663
AIRCRAFT CONTROLS

William John Strang, Bristol, England, assignor, by mesne assignments, to Bristol Aircraft Limited, Bristol, England, a British company Filed Aug. 30, 1954, Ser. No. 452,869

Claims priority, application Great Britain Sept. 2, 1953

2 Claims. (Cl. 244—90)

This invention concerns fixed wing aircraft of the kind having ailerons pivoted to the main portion of the wing and operated by servo tabs arranged at the trailing edges of the ailerons, there being control transmissions to adjust the angular relation between each aileron and its servo tab, independently of the angular relation between the aileron and the wing.

With an aircraft of this kind, when the ailerons are left free to set themselves according to the relative airstream, the ailerons float upwardly from the positions in which they constitute a smooth continuation of the wing profile, the position in which the ailerons constitute a smooth continuation of the wing profile being hereinafter referred to as the neutral setting. This upfloat increases as the stalling speed and corresponding attitude of the aircraft are approached and gives rise to a loss of lift and early onset of wing tip stall. Under these conditions the servo tabs also become ineffective as control devices and the result is that the stalling speed of the aircraft is raised and its control characteristics adversely affected, to the general detriment of its safety. In addition, the aileron upfloat reduces the longitudinal stability of the aircraft, i.e. it reduces the permissible fore and aft range of the centre of gravity.

With a view to overcoming this objection, it is known to give both port and starboard aileron servo tabs an upward deflection, but this arrangement suffers from the objection that a given upward deflection can maintain the ailerons in the neutral setting only at one particular airspeed, and moreover, the range of movement in which the servo tabs are effective as control devices is reduced.

According to this invention, in a fixed wing aircraft having ailerons each operated by at least one servo tab, resilient means are provided for each aileron urging the aileron towards a downwardly deflected setting so as to reduce or eliminate the movement of the aileron from the neutral setting when the aileron is left free to set itself in flight.

It can be shown that for all flying speeds and corresponding attitudes of an aircraft in normal flight, by which is to be understood normal flight that is to say not only level flight, but also angles of climb and descent which are normal for civil passenger aircraft when not using landing flaps, the moment required to maintain the ailerons in their neutral settings is substantially constant, and in a preferred arrangement according to the invention each aileron is urged towards the downward limit of its range of movement by said resilient means which is of such power and rate that when the aircraft is in flight, and when the aileron is left free to set itself, the ailerons take up the neutral setting or a setting not substantially removed therefrom.

By way of constructional example an arrangement according to the invention will now be described with reference to the accompanying drawing which shows diagrammatically a partial cross-section of an aircraft wing and aileron having biasing means according to the invention.

A main lifting wing, part of which is shown at 10, of a fixed wing aircraft has freely pivoted port and starboard ailerons, one of which is indicated at 11. Each aileron carries at its trailing edge a servo tab 12 connected by a suitable linkage of any known or convenient kind to the pilot's control column so that the inclination of the tabs 12 can be controlled independently of the positions of the ailerons in their upward and downward ranges of movement. A suitable linkage for this purpose is described in the National Advisory Committee for Aeronautics—Report No. 528—entitled "Reduction of Hinge Moments of Airplane Control Surfaces by Tabs"—by Thomas A. Harris of the Langley Memorial Aeronautical Laboratory, Langley Field, Va., U.S.A., dated 1935 (see pages 1 and 2 of the report).

Each aileron has a projection 13 forwardly of its pivot axis 14, the projection 13 serving as an aerodynamic balance for the aileron and also serving to house weights to provide the requisite degree of mass balancing of the aileron. From the tip of the projection 13 a sealing strip 15 of flexible material extends to the main wing structure to prevent airflow through the gap between the aileron and the wing. In the same way, each servo tab 12 has a forwardly extending projection 16 and a sealing strip 17.

According to the invention, resilient means in the form of a torsion bar spring 18 is provided for each aileron to urge the aileron towards the downward limit of its range of movement. The torsion bar spring is arranged near the tip of the projection 13 and with its axis parallel to the pivot axis 14 of the aileron, and one end of the torsion bar is anchored to the aileron while the other end of the torsion bar is supported in a journal bearing 22 carried by the projection 13 and is provided with a lever 19 projecting towards the pivot axis 14, the lever being connected by a link 20 to a pivot 21 carried by the main wing structure so that rotation of the aileron about its pivot axis 14 causes the torsion bar spring 18 to be twisted. The pivot 21, in the construction being described, is positioned so that the link 20 is at right angles to the lever 19 when the aileron is in its neutral position as shown in the drawing. Furthermore, it will be understood that the clearances provided for lateral movements of the lever 19 and the link 20 and the effective lengths of the lever and the link are selected so that the aileron may be moved through its required range of movement. The torsion bars 18 are adjusted so that when the aircraft is stationary, the ailerons are depressed to the full extent of their downward travel, and the strength and rate of the torsion bars 18 are suitably chosen so that when the aircraft becomes airborne and the landing flaps have been raised, and the ailerons are left free to set themselves, the torsion bars hold the ailerons substantially in their neutral settings when the aircraft is in flight.

So long as the aircraft is partly supported by its landing gear, or landing flaps or their equivalent are in operation, the normal flying relation between airspeed and attitude (wing incidence) is disturbed and the effect of the torsion bars 18 is to move the ailerons to a position below the neutral setting. This effect, however, provides the additional advantage that the lift under such conditions is increased.

By positioning the torsion bars forwardly of the pivot axes 14 the mass of the torsion bars serve in the mass balancing of their associated ailerons, and accordingly a lesser mass of balance weight has to be inserted within the projections 13 than would otherwise be the case if the torsion bars were not present.

The performance of the invention as described with reference to the drawing, therefore, adds very little weight to the wing structure, although, from a purely functional point of view, the torsion bar springs or other kinds of springs can be located in other positions in the ailerons or in the wings.

I claim:
1. In a fixed wing aircraft having at least one wing providing a main lifting surface, and ailerons hingeably mounted at the trailing edge of said wing, said ailerons being operable to provide lateral control for the aircraft by a system of servo tabs operatively connected with a pilot's rolling control, said servo tab system comprising at least one servo tab hingeably mounted at the trailing edge of each aileron and movable with respect to the aileron by said rolling control to operate the aileron; for each aileron, resilient means for biasing the aileron towards its neutral setting whenever the aileron is left free to set itself in flight, each said resilient means comprising a torsion bar spring arranged parallel with the hinge axis of the associated aileron, one end of the torsion bar spring being anchored to the aileron and the other end of the torsion bar spring being supported in a journal bearing carried by the aileron and being provided with a lever pivotally connected to a link which is in turn pivotally connected to said wing, so that movement of the aileron about its hinge axis causes the torsion bar spring to be twisted.

2. In a fixed wing aircraft having at least one wing providing a main lifting surface, and ailerons hingeably mounted at the trailing edge of said wing, said ailerons being operable to provide lateral control for the aircraft by a system of servo tabs operatively connected with a pilot's rolling control, said servo tab system comprising at least one servo tab hingeably mounted at the trailing edge of each aileron and movable with respect to the aileron by said rolling control to operate the aileron; for each aileron, resilient means for biasing the aileron towards its neutral setting whenever the aileron is left free to set itself in flight, each said resilient means comprising a torsion bar spring serving in mass balancing of the aileron and located forwardly of and parallel with the hinge axis of the associated aileron, one end of the torsion bar spring being anchored to the aileron and the other end of the torsion bar spring being supported in a journal bearing carried by the aileron and being provided with a lever pivotally connected to a link which is in turn pivotally connected to said wing, so that movement of the aileron about its hinge axis causes the torsion bar spring to be twisted.

References Cited in the file of this patent

UNITED STATES PATENTS

| | | |
|---|---|---|
| 1,671,081 | Miller | May 22, 1928 |
| 2,369,832 | Klose | Feb. 20, 1945 |
| 2,438,309 | Zimmerman | Mar. 23, 1948 |
| 2,718,365 | White | Sept. 20, 1955 |

FOREIGN PATENTS

| | | |
|---|---|---|
| 40,203 | France | Jan. 30, 1932 |
| | (Addition to No. 673,714) | |